United States Patent
Nishida

(10) Patent No.: US 10,949,135 B2
(45) Date of Patent: Mar. 16, 2021

(54) PRINT SYSTEM, PRINT SETTING PREDICTION METHOD, AND NON-TRANSITORY COMPUTER-READABLE STORAGE MEDIUM

(71) Applicant: CANON KABUSHIKI KAISHA, Tokyo (JP)

(72) Inventor: Takahiko Nishida, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/815,061

(22) Filed: Mar. 11, 2020

(65) Prior Publication Data
US 2020/0310700 A1    Oct. 1, 2020

(30) Foreign Application Priority Data
Mar. 27, 2019    (JP) .............................. JP2019-061360

(51) Int. Cl.
| | |
|---|---|
| *G06F 15/00* | (2006.01) |
| *G06F 3/12* | (2006.01) |
| *G06K 1/00* | (2006.01) |
| *G06N 20/00* | (2019.01) |

(52) U.S. Cl.
CPC .......... *G06F 3/1204* (2013.01); *G06F 3/1257* (2013.01); *G06F 3/1286* (2013.01); *G06F 3/1287* (2013.01); *G06N 20/00* (2019.01)

(58) Field of Classification Search
CPC .... G06F 3/1204; G06F 3/1257; G06F 3/1286; G06F 3/1287; G06N 20/00
USPC ............................... 358/1.1, 1.15, 1.13, 1.14
See application file for complete search history.

(56) References Cited

U.S. PATENT DOCUMENTS

| | | | |
|---|---|---|---|
| 10,628,092 B1* | 4/2020 | Dickinson | ............ G06F 3/1288 |
| 2019/0042551 A1* | 2/2019 | Hwang | ................ G06F 40/216 |
| 2019/0243289 A1* | 8/2019 | Onishi | ............... G03G 15/5054 |

FOREIGN PATENT DOCUMENTS

JP    5670787 B2    2/2015

* cited by examiner

*Primary Examiner* — Douglas Q Tran
(74) *Attorney, Agent, or Firm* — Venable LLP

(57) ABSTRACT

A print setting prediction method in a print system for providing print data to a printer across a network includes accepting document data as a print target; issuing print data based on print setting indicated by the print request; causing an accumulation unit to accumulate, as collected data, print setting used for issued print data and document attribute information indicated by document data in association with each other; generating, from the collected data, training data including a pair of input data containing the document attribute information and ground truth data containing the print setting; generating, by machine learning, a learning model by using the training data; predicting print setting by using the learning model and by using document attribute information indicated by the prediction request; and providing the predicted print setting to a request source.

10 Claims, 11 Drawing Sheets

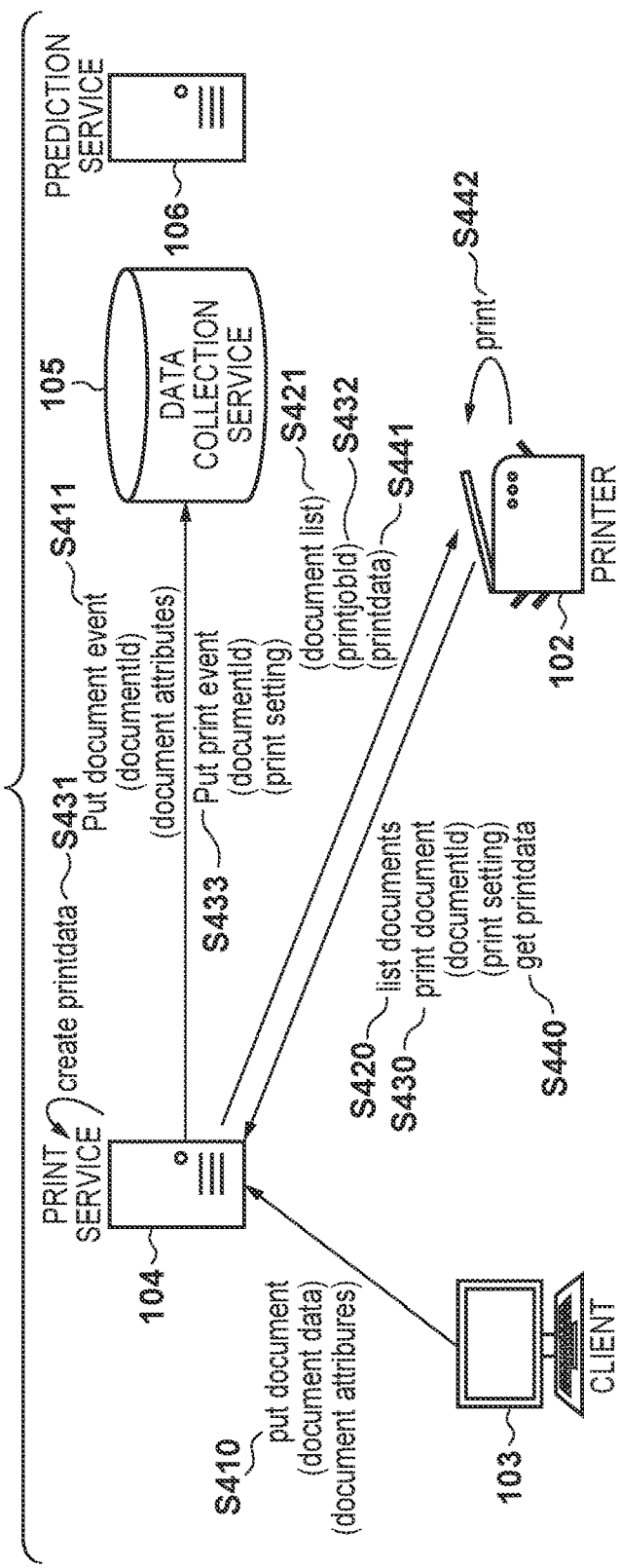
FIG. 4A
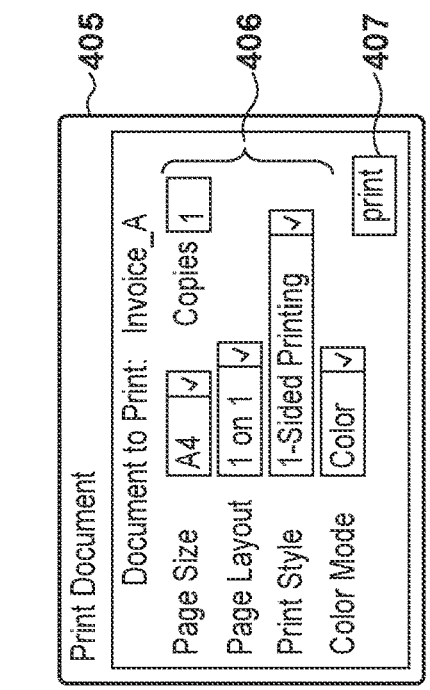
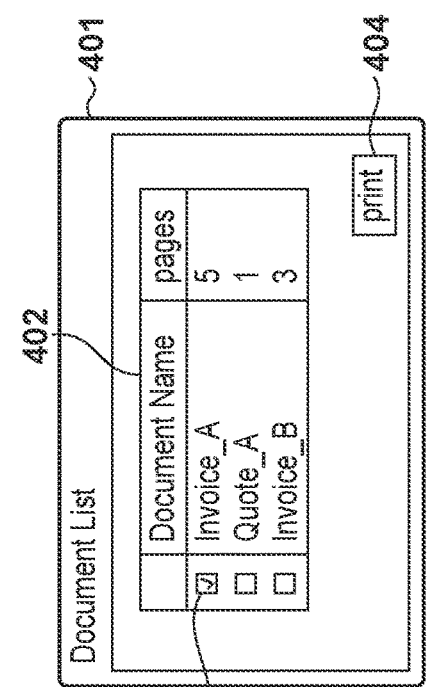
FIG. 4B

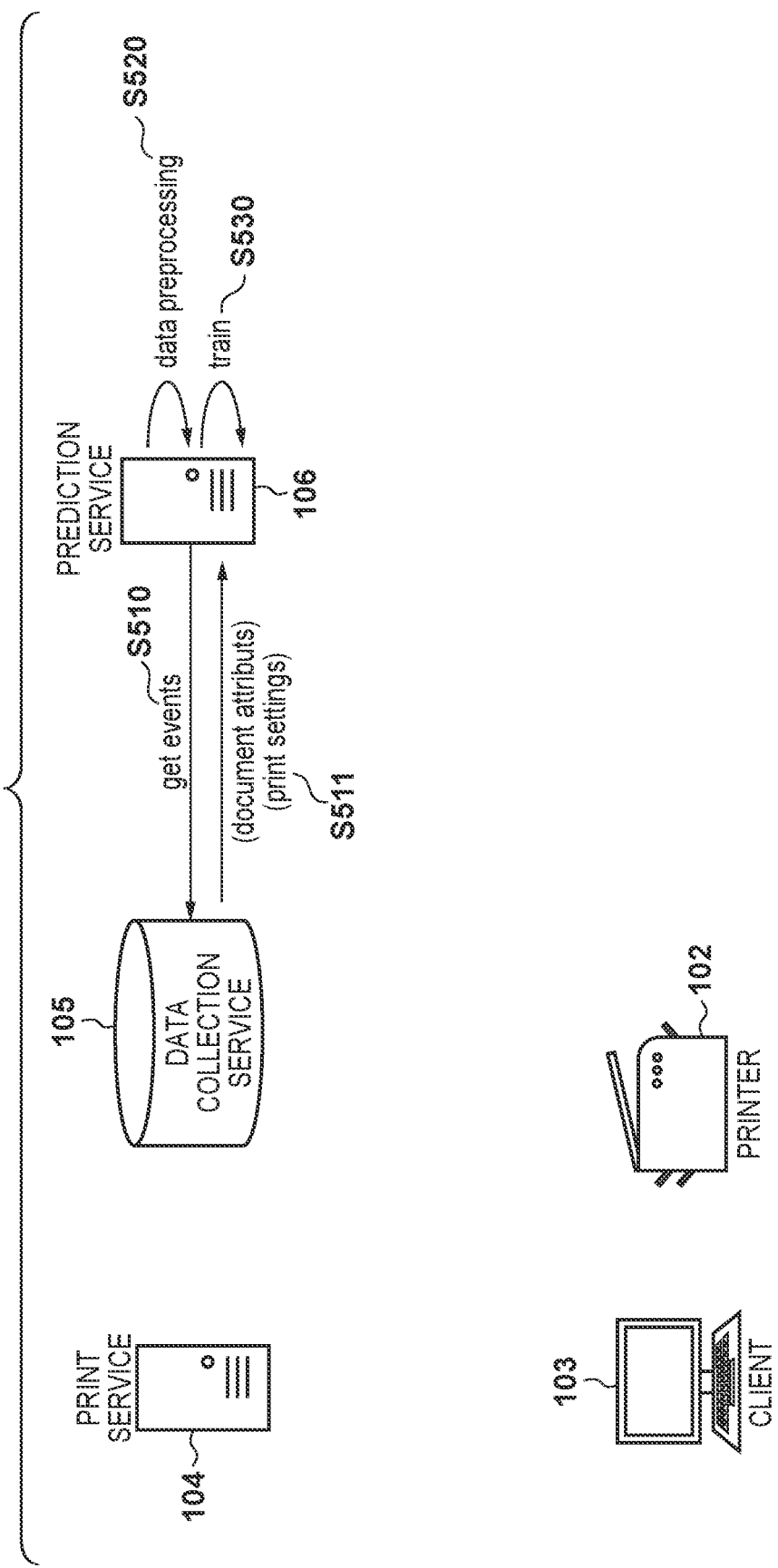

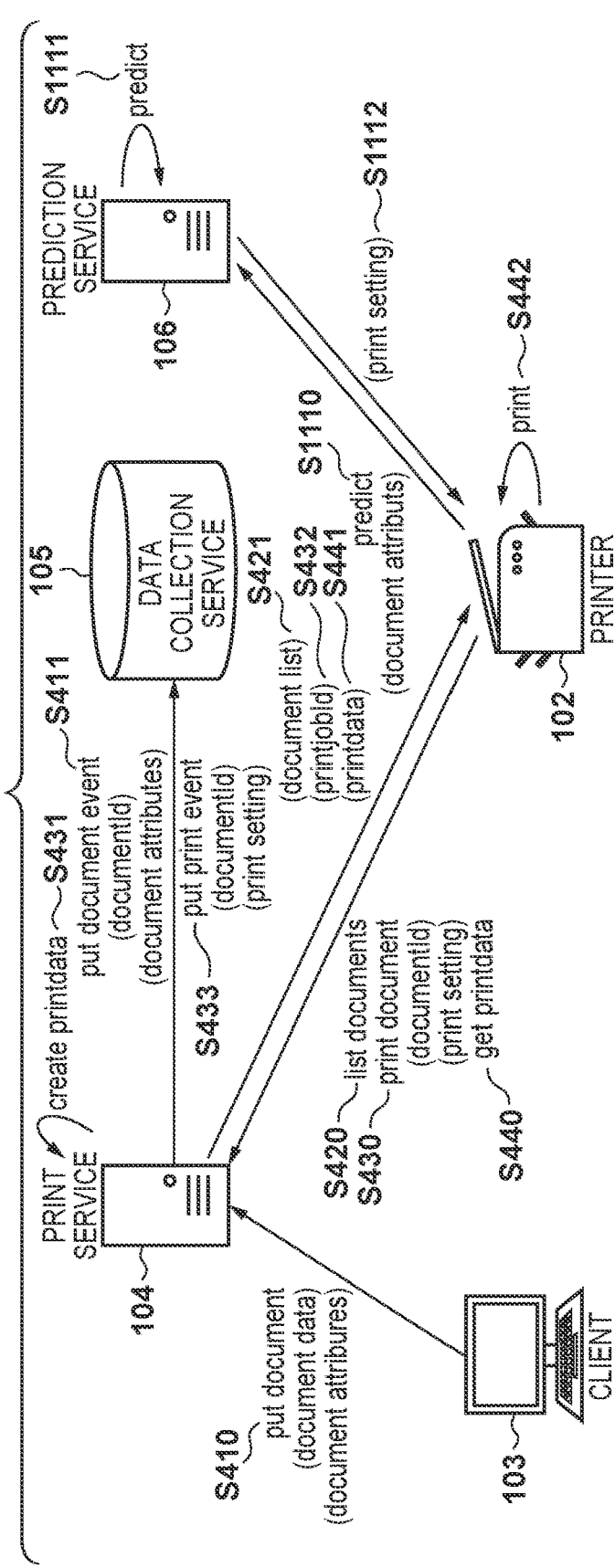

PRINT SYSTEM, PRINT SETTING PREDICTION METHOD, AND NON-TRANSITORY COMPUTER-READABLE STORAGE MEDIUM

BACKGROUND OF THE INVENTION

Field of the Invention

The present invention relates to a print system, a print setting prediction method, and non-transitory computer-readable storage medium.

Description of the Related Art

Recently, deep learning is attracting attention as one machine learning method of causing a computer to learn tasks that humans naturally perform. Deep learning is an important technique playing an important role of supporting the development of artificial intelligence (AI), and the progress of deep learning is advancing its practical use in various fields. In conventional machine learning, a model that performs, for example, classification of data is formed by manually extracting a feature amount of target data and defining the contents of learning by using the extracted feature amount in advance. On the other hand, deep learning forms a model by giving input data and a result of processing such as classification, automatically extracting a feature amount from the data, and automatically learning the processing method. Accordingly, deep learning can obtain a highly accurate result for even a complicated problem that makes it difficult to extract a feature amount by the conventional machine learning.

As cloud services advance in print systems as well, pieces of information about user operations, documents, print data, and printer and service logs are accumulated, and this may make it possible to provide new functions by using these pieces of information by machine learning. For example, Japanese Patent No. 5670787 discloses a technique by which ruled lines, the number of ruled lines, feature points, the number of feature points, color information, and the like in a business form image are accumulated as feature data for each business form type, and the features of an image of a processing target business form are compared with the accumulated feature data, thereby predicting the business form type.

As a method of using deep learning in a print system, it may be possible to use attribute information and print setting information of an input document. In a print service that provides a print system as a cloud service, the user generally performs pull printing. In conventional pull printing, the user selects a print target from a document list displayed on an operation panel of a printer, sets desired print setting whenever performing printing, and executes printing. If the print setting desired by the user beforehand can be reproduced, the user can easily give a print instruction by only selecting a print target from the list. However, the print setting includes various setting items, and use cases are also various. This makes rule-based management of the print setting difficult.

SUMMARY OF THE INVENTION

An aspect of the present invention makes it possible to give a print instruction in pull printing more easily.

An embodiment of the present invention provides a print system for providing print data to a printer across a network, the print system comprising: a managing unit configured to accept and manage document data as a print target; an issuing unit configured to issue, when a print request for document data managed by the managing unit is accepted, print data based on print setting indicated by the print request; an accumulation unit configured to accumulate, as collected data, print setting used for print data issued by the issuing unit and document attribute information indicated by document data used for the print data in association with each other; a generation unit configured to generate, from the collected data accumulated in the accumulation unit, training data including a pair of input data containing the document attribute information and ground truth data containing the print setting; a processing unit configured to perform, by machine learning, generation of a learning model to be used to predict print setting, by using the training data generated by the generation unit; a prediction unit configured to predict, when accepting a prediction request, print setting by using the learning model generated by the processing unit and by using document attribute information indicated by the prediction request as input data; and a providing unit configured to provide the print setting predicted by the prediction unit to a request source of the prediction request.

Further features of the present invention will become apparent from the following description of exemplary embodiments (with reference to the attached drawings).

BRIEF DESCRIPTION OF THE DRAWINGS

FIGS. 4A and 4B are sequence diagrams of data collection according to an embodiment of the present invention;

FIG. 5 is a sequence diagram of preprocessing and learning for collected data according to an embodiment of the present invention;

FIGS. 11A and 11B are sequence diagrams of prediction of print setting according to a first embodiment of the present invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

[System Arrangement]

Figure 1:
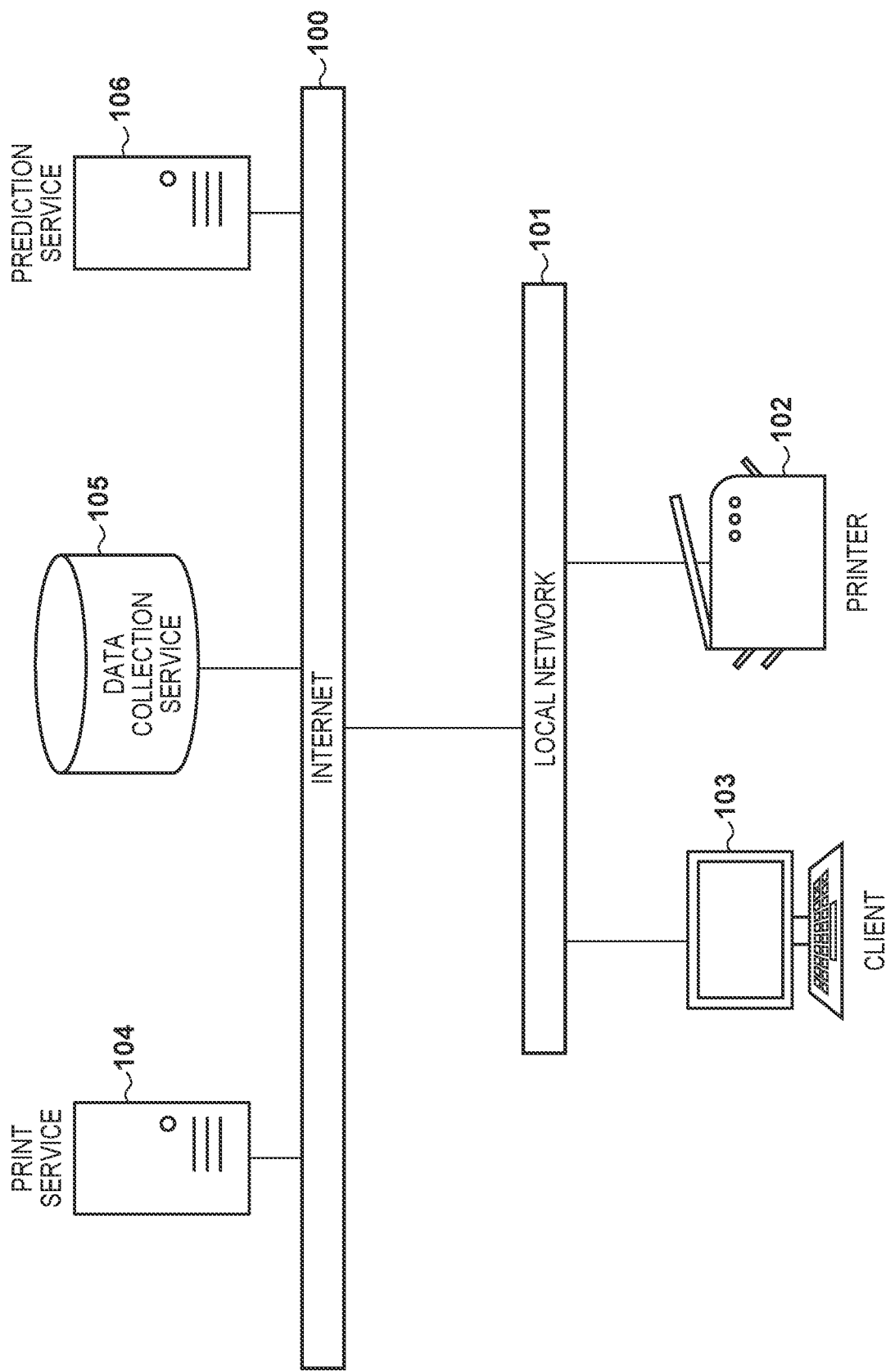
FIG. 1 is a view showing a system arrangement example according to an embodiment of the present invention.

FIG. 1 is a view showing an example of the whole arrangement of a print system according to this embodiment. In FIG. 1, a printer 102 and a client 103 access the Internet 100 across a local network 101. Servers for providing various services are installed on the Internet 100. In this example, a print service 104, a data collection service 105, and a prediction service 106 are provided. Assume that the printer 102 and the client 103 can use the various services.

The print service 104 is a service for providing pull printing, and performs management of document data, generation and management of print data, and the like. The data collection service 105 is a service for providing save and takeout (extraction) of various kinds of collected data, and accumulates attribute information and print setting information of documents for training data. In this embodiment, the data collection service 105 manages data to be used in learning performed by the prediction service 106. The prediction service 106 is a service for providing prediction of print setting. The prediction service 106 receives attribute information of a document, performs machine learning beforehand based on data managed by the data collection service 105, and predicts print setting by using a learned model obtained as a result of the machine learning. Each service is disclosed on the Internet as a cloud service made redundant by a plurality of servers. To simplify the explanation, however, this embodiment will be explained by assuming that each service is provided by one server.

[Hardware Arrangements]

Figure 2:
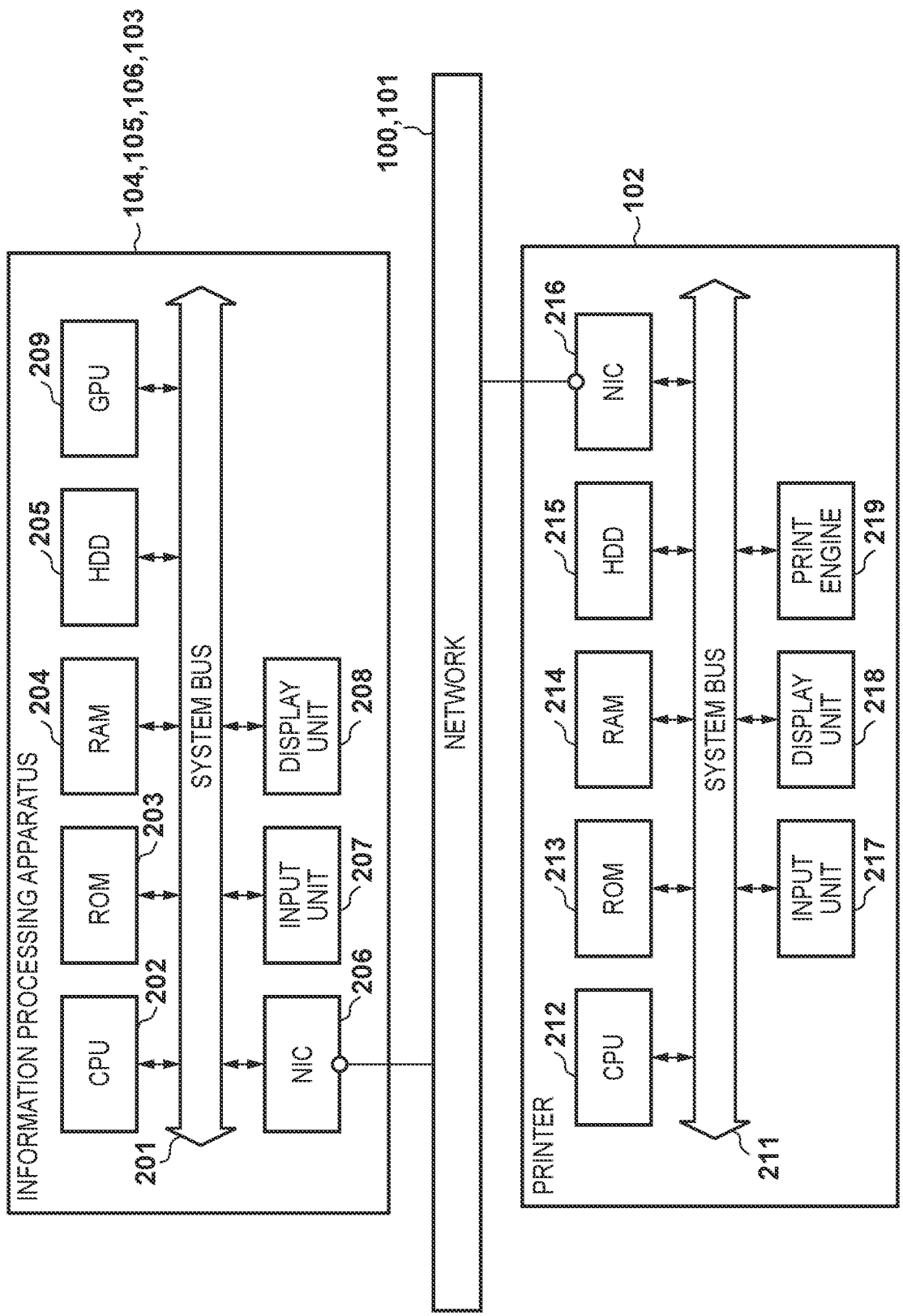
FIG. 2 is a view showing hardware arrangement examples according to an embodiment of the present invention.

FIG. 2 shows hardware arrangement examples of the print service 104, the data collection service 105, the prediction service 106, the client 103, and the printer 102 of the print system according to this embodiment. Note that FIG. 2 collectively shows apparatuses having the same hardware arrangement in order to simplify the explanation, but these apparatuses may also be implemented by physically different apparatuses.

Hardware constituent elements of the information processing apparatuses functioning as the servers for providing services and the client 103 are communicably connected by a system bus 201. A CPU (Central Processing Unit) 202 is a controller of the information processing apparatus, and executes application programs and an OS (Operating System) stored in a ROM (Read Only Memory) 203 or an HDD (Hard Disc Drive) 205. The CPU 202 also performs control for temporarily storing, for example, information and files necessary to execute programs, in a RAM 204. The ROM 203 is a nonvolatile storage unit and stores programs such as a basic I/O program. The RAM 204 is a temporary storage unit and functions as, for example, a main memory and a work area of the CPU 202 and a GPU 209. The HDD 205 is an external storage unit and is a storage device that functions as a large-capacity memory. The HDD 205 stores programs according to the present invention, such as application programs and the OS.

A NIC 206 is a network interface and exchanges data with an external apparatus across the Internet 100 and the local network 101. An input unit 207 is an interface for accepting inputs, and accepts inputs from, for example, a keyboard and a mouse (neither is shown). A display unit 208 is an output display unit and displays, for example, an output screen of each program. The GPU (Graphical Processing Unit) 209 is an arithmetic device specialized for vector arithmetic operations such as image processing and machine learning.

Hardware constituent elements of the printer 102 are communicably connected by a system bus 211. A CPU 212 is a controller of the printer 102 and executes application programs and an OS stored in a ROM 213 or an HDD 215. The CPU 212 also performs control for temporarily storing, for example, information and files necessary to execute programs, in a RAM 214. The ROM 213 is a nonvolatile storage unit and stores programs such as a basic I/O program. The RAM 214 is a temporary storage unit and functions as, for example, a main memory and a work area of the CPU 212. The HDD 215 is an external storage unit and is a storage device that functions as a large-capacity memory. The HDD 215 stores programs according to the present invention, such as application programs and the OS.

A NIC 216 is a network interface and exchanges data with each service across the Internet 100 and the local network 101. An input unit 217 is an interface for accepting inputs, and accepts inputs from, for example, an operation panel of the printer 102. A display unit 218 is an output display unit and displays, for example, an output screen of each program. A print engine 219 is a printing unit using a known printing technique, and preferred examples are an electrophotographic system (a laser beam system), an inkjet system, and a sublimation (thermal transfer) system. The print engine 219 performs a printing operation by using image data converted from print data (for example, a PDL (Page Description Language) or a PDF (Portable Document Format)).

[Software Arrangements]

Figure 3:
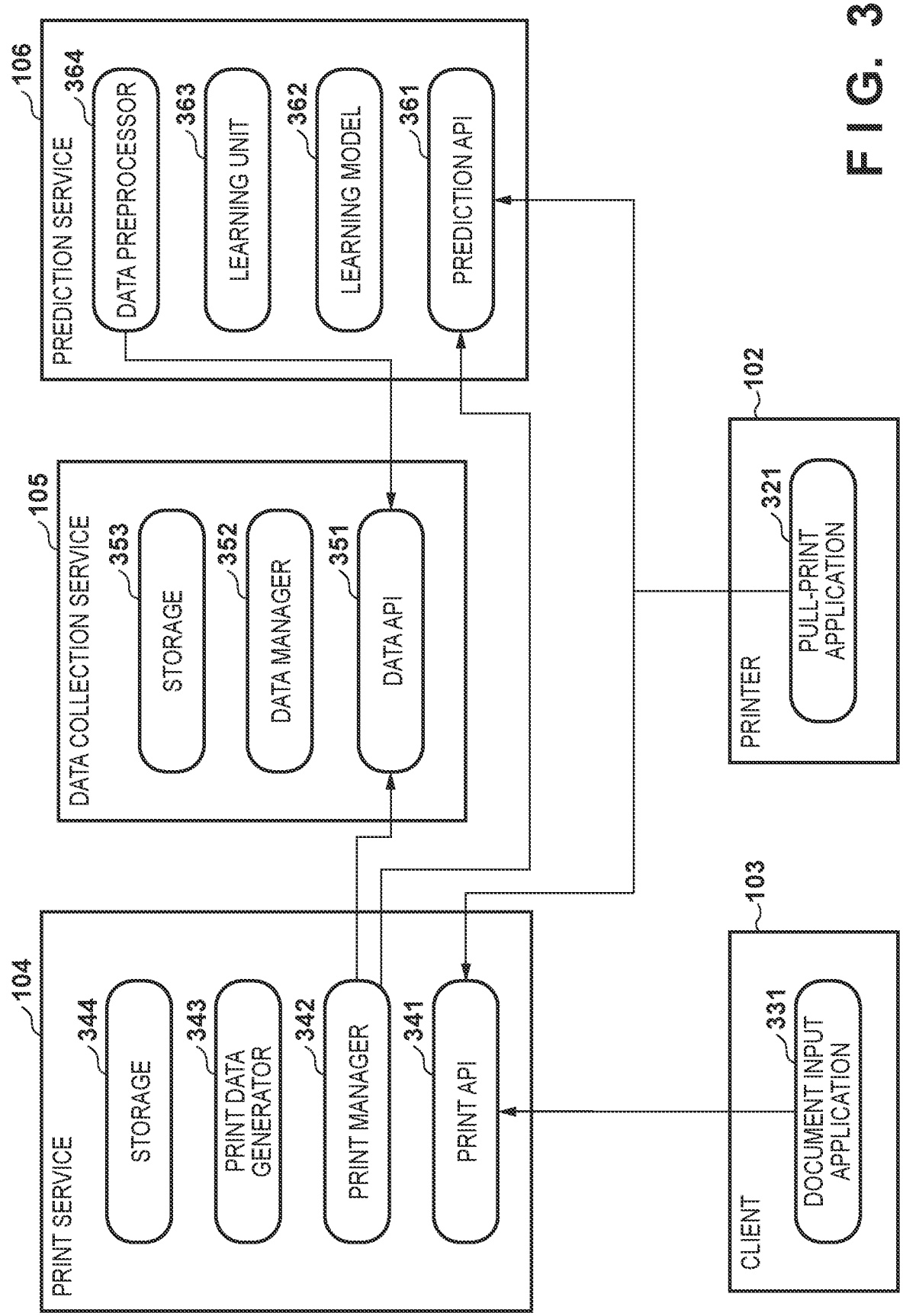
FIG. 3 is a view showing software arrangement examples according to an embodiment of the present invention.

FIG. 3 shows software arrangement examples of the print service 104, the data collection service 105, the prediction service 106, the client 103, and the printer 102 of the print system according to this embodiment.

The printer 102 includes a pull-print application 321. The pull-print application 321 is stored in the HDD 215 shown in FIG. 2, and loaded into the RAM 214 and executed by the CPU 212. In accordance with an operation accepted from the user by the input unit 217, the pull-print application 321 obtains information related to printing from the print service 104, and displays the information on the display unit 218. In addition, the pull-print application 321 transmits a request related to printing to the print service 104, obtains print data from the print service 104, transfers the print data to the print engine 219, and executes printing.

The client 103 includes a document input application 331. The document input application 331 is stored in the HDD 205 shown in FIG. 2, and loaded into the RAM 204 and executed by the CPU 202. The document input application 331 transmits document data saved in the HDD 205 in advance to a print API 341 of the print service 104, thereby inputting the document.

The print service 104 includes the print API 341, a print manager 342, a print data generator 343, and a storage 344. Each software module is stored in the HDD 205 shown in FIG. 2, and loaded into the RAM 204 and executed by the CPU 202 as described above. The print API 341 provides various interfaces of the print service 104, accepts requests for, for example, document input, document information obtainment, printing, print job information obtainment from the printer 102, and responds to these requests. Document information, document data, print job information, and print data to be processed by the print service 104 are stored in the storage 344, and managed by the print manager 342.

The data collection service 105 includes a data API 351, a data manager 352, and a storage 353. Each software module is stored in the HDD 205 shown in FIG. 2, and loaded into the RAM 204 and executed by the CPU 202 as described above. The data API 351 provides various interfaces of the data collection service 105, accepts an event data saving request from the print service 104 and a data obtaining request from the prediction service 106, and responds to these requests. Various kinds of collected data are stored in the storage 353 and managed by the data manager 352.

The prediction service 106 includes a prediction API 361, a learning model 362, a learning unit 363, and a data preprocessor 364. Each software module is stored in the HDD 205 shown in FIG. 2, and loaded into the RAM 204 and executed by the CPU 202 and the GPU 209 as described above. The prediction API 361 provides various interfaces of the prediction service 106, accepts print setting prediction requests from the print service 104 and the printer 102, and responds to these requests. Print setting prediction is performed by the learning model 362 by using document attribute information received as input data from the prediction API 361.

The learning unit 363 performs learning of a learning model (to be described later) by using vectorized training data generated by the data preprocessor 364. The data preprocessor 364 obtains collected data by transmitting a data obtaining request to the data API 351 of the data collection service 105, and performs preprocesses such as extraction, structuration, and vectorization of data necessary for learning (to be described later).

Consequently, the data preprocessor 364 generates vectorized training data that can be used in learning by the learning unit 363.

[Data Collection]

The sequences of document input, a printing process, and processed data collection according to this embodiment will be explained below with reference to FIGS. 4A and 4B.

In step S410, the document input application 331 of the client 103 transmits a document input request containing document data to be printed and its attribute information to the print API 341. When the print service 104 receives this document input request, the print manager 342 saves the document data in the storage 344, and registers document information.

Table 1 shows an arrangement example of the document information to be managed by the print manager 342 of the print service 104. doc_id is a document ID (identifier) for uniquely identifying a document to be managed, and is a value to be issued by the print manager 342 when registering the document information. doc_name is a document name designated as attribute information when requesting document input, and is used in, for example, display by which the user identifies the document. doc_path is the saving destination of document data of the document indicated by the document information, and the document data on the storage 344 can be accessed by referring to the value of doc_path. doc_pagesize, doc_color, and doc_pages are pieces of attribute information representing the features of the document, that is, the page size, the color mode, and the number of pages, respectively. The attribute information is not limited to them, and any information can be used as long as the information represents the feature of the document data. As these pieces of attribute information, it is possible to register values obtained by analyzing the document data by the print data generator 343 of the print service 104, or use values received together with the document input request from the client, like doc_name.

TABLE 1

| doc_id | doc_name | doc_path | doc_pagesize | doc_color | doc_pages | ... |
|---|---|---|---|---|---|---|
| doc-001 | Invoice_A | docs/doc-001/data.pdf | A4 | BW | 5 | ... |
| doc-002 | Quote_A | docs/doc-002/data.pdf | A3 | CL | 1 | ... |
| doc-003 | Invoice_B | docs/doc-003/data.pdf | B5 | BW | 3 | ... |
| ... | | ... | ... | ... | ... | ... |

When the document data is input and the document information is registered in step S410, the process advances to step S411, and the print manager 342 of the print service 104 transmits the document information to the data API 351 of the data collection service 105. The data manager 352 of the data collection service 105 records the document data received by the data API 351 in the storage 353.

In step S420, the pull-print application 321 of the printer 102 transmits a document information list obtaining request to the print API 341 of the print service 104. The print service 104 accepts the document information list obtaining request by the print API 341.

In step S421, the print service 104 obtains document information by the print manager 342 in response to the document information list obtaining request, and transmits a list containing this document information to the printer 102. The pull-print application 321 of the printer 102 displays the document information list received from the print service 104 on a document information list screen 401. The document information list screen 401 shown in FIG. 4B includes a document information list 402 received in step S421, a check box 403 for selecting a print target, and a print button 404 for giving a print instruction.

When the print button 404 of the document information list screen 401 is pressed by a user's operation, the pull-print application 321 of the printer 102 displays a print setting screen 405 for the document information selected by the check box 403. The print setting screen 405 includes setting items (pulldowns and a text box) 406 for designating print attributes supported by the print service 104, and a print button 407 for a print instruction. In this embodiment, it is possible to designate, for example, the page size, the page layout, one-sided/two-sided printing, the color mode, and the number of copies, as the setting items 406. However, the present invention is not limited to this, and another print attribute may also be designated.

When print setting is designated and the print button 407 is pressed on the print setting screen 405 by a user's operation, the process advances to step S430, and the pull-print application 321 transmits a print request to the print API 341 of the print service 104. In this step, the pull-print application 321 adds the document ID of the document selected on the document information list screen 401, and the print setting designated on the print setting screen 405, to the print request. When the print API 341 accepts the print request from the printer 102, the print manager 342 of the print service 104 registers print job information corresponding to the contents of the request.

Table 2 shows an arrangement example of the print job information to be managed by the print manager 342 of the print service 104. job_id is a print job ID (identifier) for uniquely identifying a print job to be managed, and is a value to be issued by the print manager 342 when registering the print job information. doc_id is the document ID of the document as the original of the print data designated by the print request. job_path is the saving destination of the print data of the print job indicated by the print job information. The print data on the storage 344 can be accessed by referring to this value. job_papersize, job_color, job_copies, and job_layout are the attribute values of the print setting designated on the above-described print setting screen 405 and contained in the print request.

TABLE 2

| job_id | doc_id | job_path | job_papersize | job_color | job_copies | job_layout | ... |
|---|---|---|---|---|---|---|---|
| doc-001 | doc-001 | jobs/job-001/data.pd1 | A4 | BW | 1 | 2in1 | ... |
| doc-002 | doc-002 | jobs/job-002/data.pd1 | A4 | CL | 1 | 1in1 | ... |
| doc-003 | doc-003 | jobs/job-003/data.pd1 | A5 | BW | 2 | 2in1 | ... |
| ... | ... | ... | ... | ... | ... | ... | ... |

In step S432, the print manager 342 instructs the print data generator 343 to generate print data, and returns the print job ID to the pull-print application 321. On the other hand, in step S431, the print data generator 343 obtains the document data from doc_path of the document information by using doc_id of the print job information as a key, generates print data by converting the document data, and saves the print data in a path, which is indicated by job_path, of the storage 344. In this step, the print manager 342 transmits the registered print job information to the data API 351 of the data collection service 105. Then, the data manager 352 of the data collection service 105 records the data received from the print service 104 in the storage 353.

In step S440, the pull-print application 321 of the printer 102 transmits, to the print API 341 of the print service 104, a print data obtaining request containing the print job ID received in step S432 as a response to the print request.

In step S441, the print manager 342 of the print service 104 checks job_path of the print job information of the print job ID contained in the print data obtaining request accepted by the print API 341, and obtains the corresponding print data saved in the storage 353. Then, the print manager 342 returns the print data to the pull-print application 321, as a response to the print data obtaining request.

In step S442, the pull-print application 321 of the printer 102 transmits the received print data to the print engine 219, and executes printing.

By the mechanism of these processes, document information input by the print service 104 and print job information generated by the print request are associated with each other, and accumulated in the storage 353 of the data collection service 105. Assume that collected data enough for training data (to be described later) are accumulated in the data collection service 105. Note that information to be managed as the document information and the print job information described above is not limited to the abovementioned information. For example, it is also possible to further use information of the user having issued a request, information of an apparatus for performing printing, and other information (a time zone and position information) about printing.

[Data Preprocessing/Teacher Data Formation]

Next, data preprocessing by which the prediction service 106 forms vectorized training data to be used in learning of a learning model from the document information and the print job information accumulated in the data collection service 105 will be explained.

In step S510, the data preprocessor 364 of the prediction service 106 calls the data API 351 of the data collection service 105.

In step S511, the data manager 352 of the data collection service 105 extracts the document information and the print job information accumulated in the storage 353 by the above-described data collection, and returns them to the prediction service 106. The amount of data obtained by the data preprocessor 364 is the amount of information to be used in learning of a learning model, so the prediction accuracy expectably improves as the data amount increases. It is also possible to install a query I/F (interface) in the data API 351 of the data collection service 105, and cause the data manager 352 to extract data from the storage 353 and return the data in accordance with the conditions designated by the data preprocessor 364.

In step S520, the data preprocessor 364 connects the document information and the print job information obtained in step S511 by using doc_id (that is, the document ID) as a key, and obtains training data by extracting only elements to be used in learning. Table 3 shows an example of training data obtained by connecting the document information and the print information, and extracting document attribute information as prediction input data and print setting information as ground truth data.

TABLE 3

| doc_pagesize | doc_color | doc_pages | ... | job_copies | ... |
|---|---|---|---|---|---|
| A4 | BW | 5 | ... | 1 | ... |
| A3 | CL | 1 | ... | 1 | ... |
| B5 | BW | 3 | ... | 2 | ... |
| ... | ... | ... | ... | ... | ... |

In addition, the data preprocessor 364 vectorizes the values of elements representing categories by character strings such as doc_pagesize and doc_color. In this embodiment, one-hot-encoding as a well-known method is used as the method of vectorization. One-hot-encoding replaces an element representing a category with a value having one or more Os and a value 1. For example, doc_color is a category element taking two types of values, that is, BW representing black and white and CL representing color. This category element is replaced with two values, that is, doc_color BW and doc_color_CL. Data in which doc_color is BW has doc_color BW=1 and doc_color_CL=0. One-hot-encoding is similarly performed on other category elements.

Table 4 shows an example of vectorized training data obtained by vectorizing the category elements by one-hot-encoding. In Table 4, doc_pagesize_A4, doc_pagesize_A3, and doc_pagesize_B5 are obtained by vectorizing doc_pagesize in Table 3. Also, doc_color BW and doc_color_CL are obtained by vectorizing doc_color in Table 3. The values of doc_pages and doc_copies are the values shown in Table 2. Note that the vectorization method is not limited to one-hot-encoding. For example, doc_pagesize may also be vectorized as a feature expressing the size relationship by replacing doc_pagesize with a quantitative value such as the area of each paper size.

function of the hidden layer 620. However, the present invention is not limited to this, and it is also possible to use a tan h function or a ReLu function as the activation function.

Figure 7:
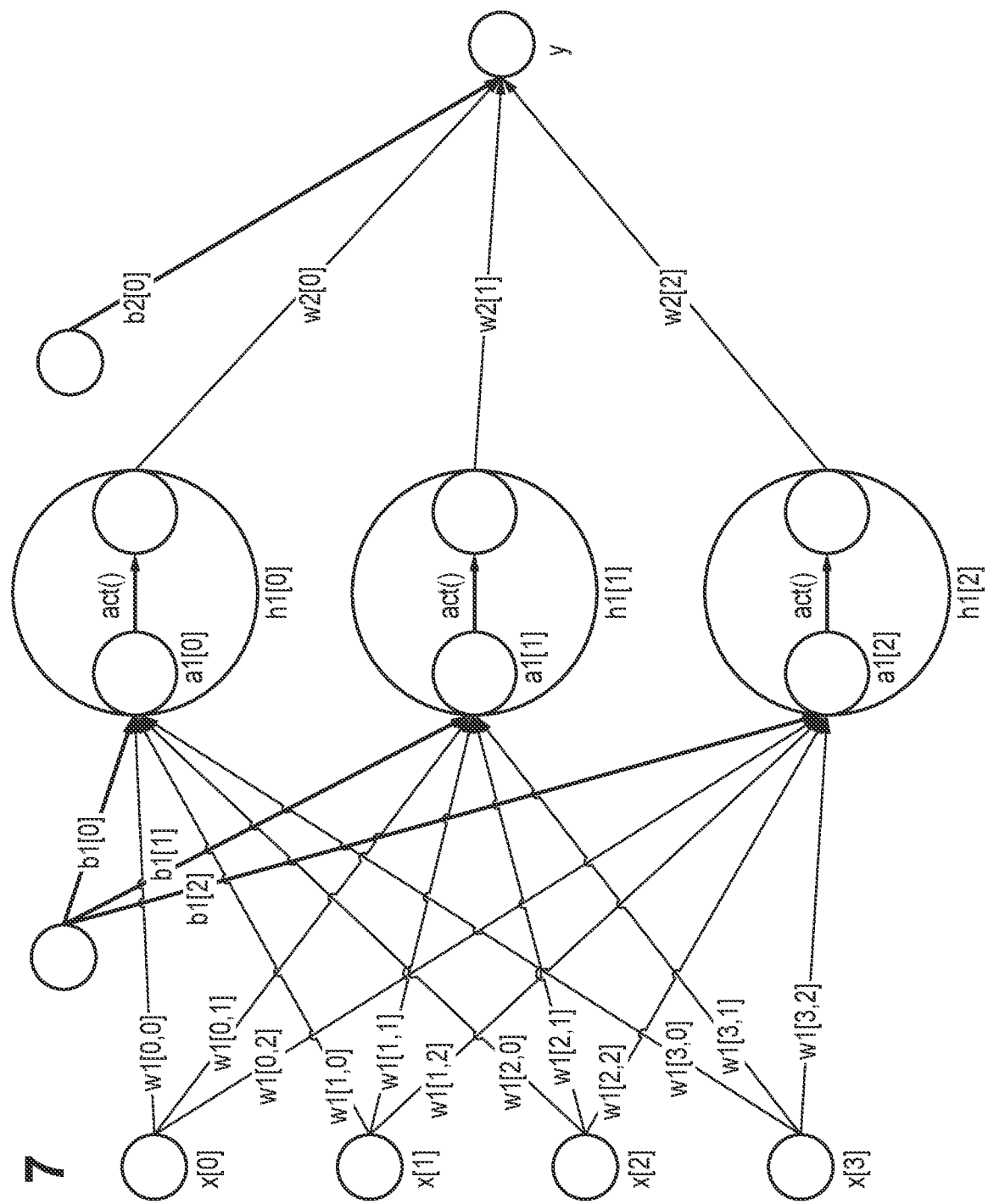
FIG. 7 is a view for explaining an activation function of a hidden layer in the neural network.
Figure 8:
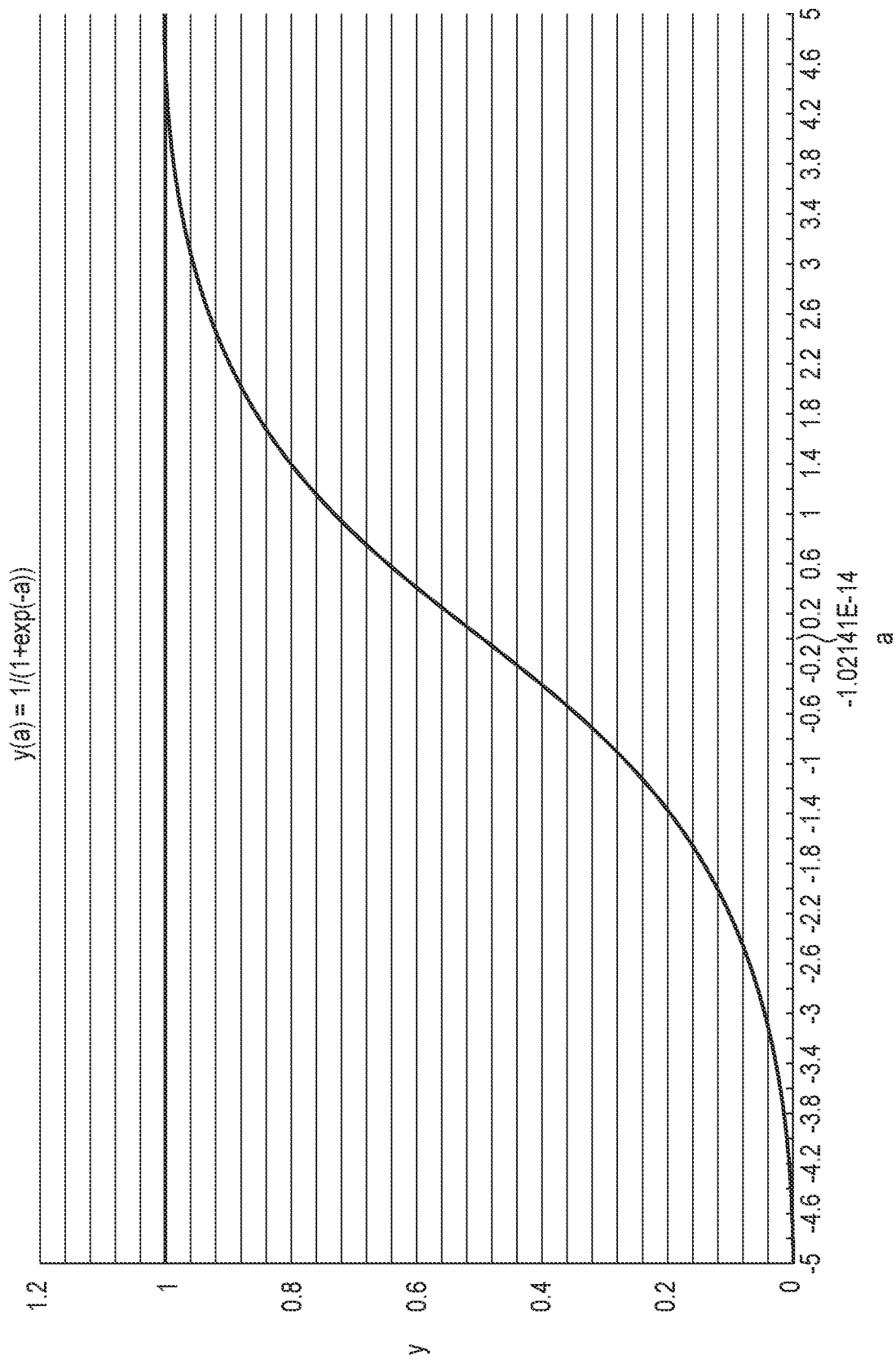
FIG. 8 is a view for explaining a sigmoid function.

FIG. 8 shows an example of the sigmoid function. This function is given by equation: $f(a)=1/(1+\exp(-a))$, and returns an output within a range from 0 to 1 with respect to an input. Consequently, an output h of all neurons of the hidden layer 620 takes a value from 0 to 1. In this case, a total sum a of the weighted signals and the biases shown in FIG. 7, an output signal h of the hidden layer 620, and an output signal y of the output layer 630 can be calculated by:

$$a1[0]=w1[0,0]\times x[0]+w1[1,0]\times x[1]+w1[2,0]\times x[2]+w1[3,0]\times x[3]+b1[0],$$

$$a1[1]=w1[0,1]\times x[0]+w1[1,1]\times x[1]+w1[2,1]\times x[2]+w1[3,1]\times x[3]+b1[1],$$

$$a1[2]w1[0,2]\times x[0]+w1[1,2]\times x[1]+w1[2,2]\times x[2]+w1[3,2]\times x[3]+b1[2],$$

TABLE 4

| doc_pagesize_A4 | doc_pagesize_A3 | doc_pagesize_B5 | ... | doc_color_BW | doc_color_CL | doc_pages | ... | job_copies | ... |
|---|---|---|---|---|---|---|---|---|---|
| 1 | 0 | 0 | ... | 1 | 0 | 5 | ... | 1 | ... |
| 0 | 1 | 0 | ... | 0 | 1 | 1 | ... | 1 | ... |
| 0 | 0 | 1 | ... | 1 | 0 | 3 | ... | 2 | ... |
| ... | | | ... | ... | ... | ... | ... | ... | ... |

In step S530, the learning unit 363 performs learning of a learning model by using the vectorized training data preprocessed by the data preprocessor 364 as described above.

[Neural Network]

As a method to be used in prediction of this embodiment, regression for predicting quantitative data by using a multilayer perceptron called a feedforward neural network or the like as a basic algorithm of deep learning will be explained.

Figure 6:
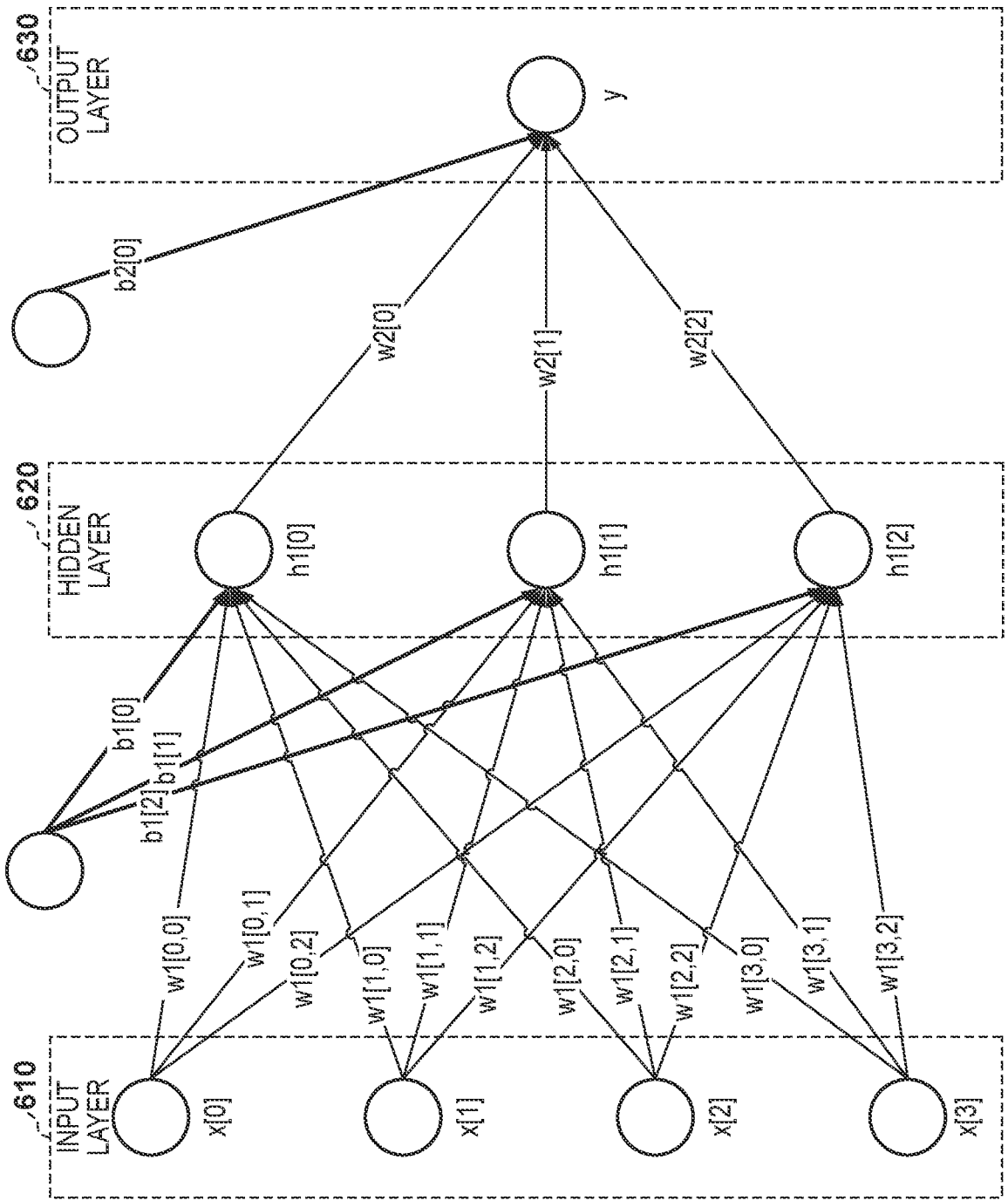
FIG. 6 is a view for explaining a neural network.

FIG. 6 shows an example of a conceptual arrangement of the neural network. The neural network is expressed by a mathematical model by imitating nerve cells (neurons) in the brain of a human and a neural network as a network for transmitting signals.

FIG. 6 shows an example of the neural network including three layers, that is, an input layer 610, a hidden layer 620, and an output layer 630. In each layer, a white circle (○) represents a neuron. The input layer 610 includes four neurons that accept four input signals x[0] to x[3]. The hidden layer 620 includes three neurons that accept signals from the input layer 610, and output signals h[0] to h[2] to the output layer 630. The output layer 630 includes a neuron for one output signal y.

In FIG. 6, w shown for a node connecting neurons indicates a weight for an output signal. w1[0, 0] to w1[3, 2] are weights for signals from the neurons of the input layer 610 to the neurons of the hidden layer 620. Likewise, w2[0] to w2[2] represent weights for signals from the hidden layer 620 to the output layer 630. Furthermore, b1[0] to b1[2] represent biases for signals to the hidden layer 620, and b2[0] represents a bias for a signal to the output layer 630.

FIG. 7 is an enlarged view of the neurons of the hidden layer 620 shown in FIG. 6. Referring to FIG. 7, an activation function act( ) is applied to each neuron of the hidden layer 620 in order to determine how to activate the sum total a1[0], a1[1], or a1[2] of the input signals from the preceding layer and transfer the result of activation to the next neuron. In this embodiment, a sigmoid function is used as the activation $$h1[0]=act(a1[0]),$$

$$h1[1]=act(a1[1]),$$

$$h1[2]=act(a1[2]), \text{ and}$$

$$y=w2[0]\times h1[0]+w2[1]\times h1[1]+w2[2]\times h1[2]+b2[0].$$

The neural network can express various pattern outputs with respect to an input signal by changing the values of the weight w and the bias b. In addition, when the number of layers and the number of neurons of the hidden layer 620 are changed, the numbers of the weights w and the biases b increase, and this increases the number of processing patterns that the neural network can express. Generally, when the number of neurons is increased, the flexibility of the network increases, and this makes it possible to grasp more complicated features. However, if the number of neurons is excessively increased, accidental noise contained in training data may also be learned. Accordingly, the numbers of layers and neurons of the hidden layer 620 are adjusted in accordance with the purpose.

A learning model according to this embodiment is defined and learned for each print setting attribute (setting item) to be predicted, an attribute for designating a consecutive value such as the number of copies is handled as a problem of regression, and the prediction of a selective attribute such as the color mode or the page size is handled as a problem of classification. However, the number of predicted values to be handled by one learning model does not restrict the present invention, and it is also possible to define a model for predicting a plurality of attribute values. In addition, another machine learning algorithm may also be used as the algorithm of a learning model. For various setting items of the print setting, therefore, learning need not be performed in the same way by the same method, but can be changed in accordance with the contents.

[Learning in Neural Network]

Learning of the neural network will be explained. The feature of the neural network is that learning can be performed from data, and the learning is to adjust the weight w and a bias b described above so as to adapt them to training data collected in advance. A loss function is used as an index of the learning of the neural network. The loss function is a function that evaluates, by using ground truth data, a result obtained by giving vectorized training data as input data to the neural network, and calculates the inadaptivity as a loss. The target of the neural network learning is to make this value closer to 0 (that is, perfect matching).

In this embodiment, an error sum of squares is used as the loss function, and a loss L is calculated by equation (1) below. Another function such as a cross entropy error may also be used as the loss function.

$$L = \tfrac{1}{2} \Sigma_k (y_k - t_k)^2 \qquad (1)$$

where $y_k$ represents predicted data as an output from the neural network, $t_k$ represents ground truth data of vectorized training data, and k represents the number of dimensions, that is, the number of neurons in the output layer.

Figure 9:
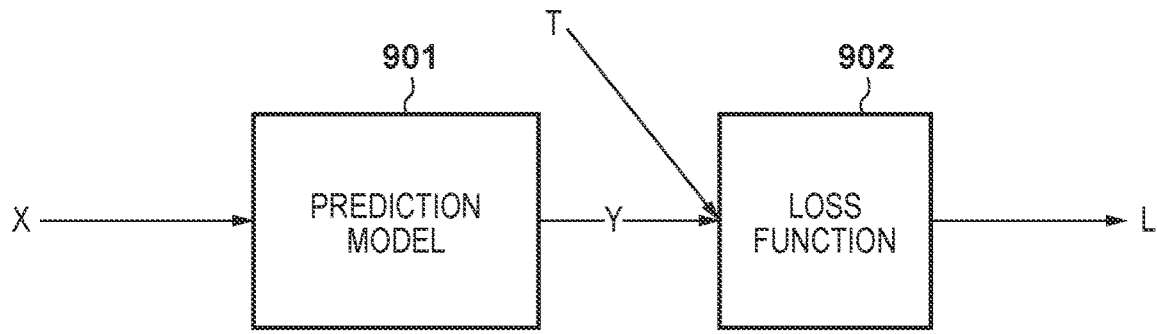
FIG. 9 is a view showing a data flow example in a learning process of a learning model.

FIG. 9 is a view showing a data flow when obtaining the loss L to be used in the learning of a learning model. A prediction model 901 is a learning model holding the parameters w and b shown in FIG. 6 described previously. When input data X is input, the prediction model 901 outputs predicted data Y. A loss function 902 can calculate the loss L when ground truth data T and the predicted data Y are input. X, Y, and T respectively represent input data, predicted data, and ground truth data each containing a plurality of values corresponding to the number of dimensions. In this case, the numbers of dimensions of Y and T are the same.

In this embodiment, a gradient method (a gradient descent method) as a well-known method is used as the method of decreasing the loss L by adjusting the parameters w and b. The gradient method repeats a process of obtaining the differential of each of the parameters w and b of the above-described loss function as a gradient, and updating the value of each of the parameters w and b in a direction opposite to the gradient. This can expectably decrease the loss L obtained by the loss function. In addition, an error backpropagation method as a well-known method can be used as the method of efficiently obtaining the gradient of each of the parameters w and b to be used in the gradient method.

The learning process of a learning model performed in step S530 of FIG. 5 will be explained by taking an example in which the number-of-copies attribute of the print setting is predicted by using the vectorized training data shaped in the data preprocessing (step S520 in FIG. 5).

Tables 5 and 6 are examples in which rows necessary to predict the number-of-copies attribute according to this embodiment are extracted as input data and ground truth data from the vectorized training data in Table 4. Learning is performed by using print attribute information as the input data (Table 5), and the number-of-copies item of print setting information as the ground truth data (Table 6). As shown in Table 5, the learning of the learning model to be used to predict the number-of-copies attribute is performed by using the page size, the color setting, the number of pages, and the like.

TABLE 5

| doc_pagesize_A4 | doc_pagesize_A3 | doc_pagesize_B5 | ... | doc_color_BW | doc_color_CL | doc_pages |
|---|---|---|---|---|---|---|
|  | 0 | 0 | ... | 1 | 0 | 5 |
| 0 | 1 | 0 | ... | 0 | 1 | 1 |
| 0 | 0 | 1 | ... | 1 | 0 | 3 |
| ... |  |  | ... | ... | ... | ... |

TABLE 6

| job_copies |
|---|
| 1 |
| 1 |
| 2 |
| ... |

[Learning Procedure]

Figure 10:
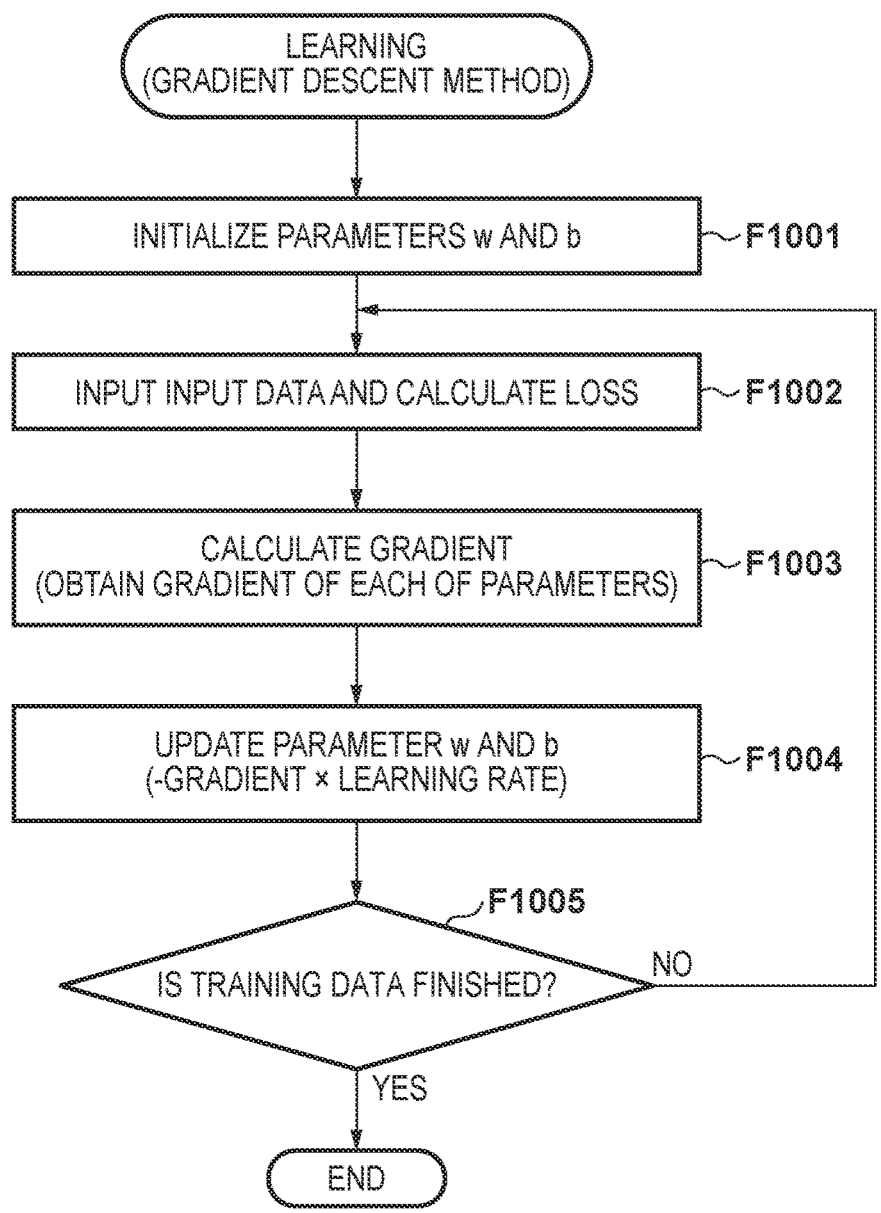
FIG. 10 is a flowchart of a learning process using a gradient descent method.

FIG. 10 is a flowchart showing learning using the above-described gradient descent method. In this embodiment as described previously, the learning unit 363 of the prediction service 106 performs this process shown in FIG. 10.

In step F1001, the learning unit 363 initializes the parameters w and b of a learning model. As the initialization value, it is possible to use, for example, a value obtained by weighting a random number in a normal distribution by "0.01".

In step F1002, the learning unit 363 extracts a record from prepared input data, and inputs the record as the input X to the learning model. Then, the learning unit 363 calculate the loss L by inputting the predicted data Y obtained from the learning model and the ground truth data T corresponding to the input data, to the loss function (in this example, equation (1) presented earlier). Assume that the calculated loss and the parameters w and b of the loss function used in this calculation are stored.

In step F1003, the learning unit 363 obtains the differential of each of the parameters w and b of the loss function as a gradient, from a change amount between the loss L obtained by the last processing and the loss L obtained by this processing in step F1002.

In step F1004, the learning unit 363 updates the value of each parameter in a direction opposite to the gradient of the parameter obtained in step F1003. The amount of update is called a learning rate, and determines the degree of update of the parameter by one learning. The value of the learning rate must be determined beforehand, and the learning rate is "0.01" in this embodiment. However, the learning rate can be determined while being adjusted in accordance with the result of learning.

In step F1005, the learning unit 363 determines whether learning has been performed by using all prepared vectorized training data. If it is determined that learning is incomplete (NO in step F1005), the process returns to step F1002, and is repeated by using unused vectorized training data, thereby repeating the adjustment of the parameters of the learning model. If it is determined that learning is complete (YES in step F1005), this process procedure is terminated.

Consequently, the learning model has performed learning for predicting the number-of-copies attribute of the print setting from attribute information of the document, by using the training data collected by the data collection service 105. The learning model having the parameters adjusted by this learning is called a learned model. The learned model operates as a function approximating the pattern of the training data used in the learning. A result can be predicted from unknown input data by using the learned model obtained by the above processing.

The learned model of this example that predicts the number-of-copies attribute of the print setting receives unknown input data containing the same items as shown in Table 5, and outputs the value of the number-of-copies attribute of the print setting by a fractional value as predicted data.

The prediction service 106 allocates, in the learning model 362, the learned model having learned by the learning procedure (FIG. 10) for each attribute information of the print setting. In this embodiment, examples of the attribute information forming the input data are the page size attribute, the page layout attribute, the one-sided/two-sided printing attribute, and the color mode attribute. The prediction service 106 can perform relearning of the learning model 362 by using training data kept accumulated in the data collection service 105 by the print service 104. This relearning can be performed on a regular basis or in real time, and can also be performed based on a manual relearning instruction.

[Prediction of Print Attributes]

A sequence by which the printer 102 requests the print service 104 to perform printing by the print setting predicted by the prediction service 106 will be explained with reference to FIGS. 11A and 11B. In this embodiment, only the differences from FIGS. 4A and 4B will be explained below.

In step S431, the pull-print application 321 receives a document information list from the print service 104, and displays the document information list on a document information list screen 1101.

In step S1110, the pull-print application 321 transmits, to the prediction API 361 of the prediction service 106, a prediction request for print setting including attribute information of document information contained in the document information list.

In step S1111, the prediction service 106 accepts the prediction request by the prediction API 361, and inputs, as input data, the attribute information of the document information received by the request to the learned model of each attribute of the print setting, which is allocated in the learning model 362. Then, the prediction service 106 obtains predicted data output from the learned model. In addition, the prediction service 106 converts the predicted data into a predicted value usable as an attribute value of the actual print setting. For example, predicted data obtained as a fractional value by regression, such as the number-of-copies attribute, is converted into the closest integral value. Also, predicted data obtained by classification, such as the color mode attribute, is converted into an attribute value corresponding to a class having the highest probability.

In step S1112, the prediction API 361 returns the print setting converted as a predicted value to the printer 102 as the request source of the prediction request.

The document information list screen 1101 shown in FIG. 11B includes a printing-with-recommendation-settings check box 1103, as the difference from the document information list screen 401 shown in FIG. 4B. Assume that a document is selected in a document information list 1102 and a print button 1104 is pressed with the printing-with-recommendation-settings check box 1103 being checked by a user's operation. In this case, in step S430, the pull-print application 321 transmits a print request to the print service 104 by using the corresponding document ID and the print setting received in step S1112. In this step, a print setting screen 1105 corresponding to the print setting screen 405 shown in FIG. 4B is not displayed, and the user can perform printing by the print setting predicted by the prediction service 106 without manipulating the print setting by the user himself or herself. After that, the print service 104 generates print data by using the predicted print setting, and transmits the print data to the printer 102.

Also, when a document is selected in the document information list 1102 and the print button 1104 is pressed on the document information list screen 1101 with the printing-with-recommendation-settings check box 1103 being not checked, the pull-print application 321 displays the print setting screen 1105. In this case, the print setting screen 1105 is displayed after the attribute value of the print setting obtained in step S1112 is set as an initial value of each attribute value of the print setting screen 1105. That is, even when the printing-with-recommendation-settings check box 1103 is not checked, the print setting is predicted in accordance with the attribute value of the document data, and the display of the initial value of each setting item of the print setting screen 1105 is controlled based on this prediction.

As described above, the print setting predicted by the prediction service 106 is used as recommended setting when giving a print instruction by pull printing. Consequently, the printer 102 can reproduce print setting desired by the user or close to that beforehand. This enables the user to give a pull-print instruction more easily.

Second Embodiment

In the pull-print printing instruction sequence of the first embodiment, the print setting predicted by the printer 102 by using the prediction service 106 is automatically set or displayed. However, the print setting predicted by the prediction service 106 is the result of approximation of the pattern of training data extracted from data accumulated in the data collection service 105. Therefore, it is not always possible to predict print settings desired by all users. Accordingly, a user may not desire the prediction of print setting in some cases.

As the second embodiment of the present invention, an embodiment that switches prediction processes by holding the setting of effective or ineffective of a print setting prediction function for each user will be explained below. Note that the reference numerals and the names are the same as the first embodiment unless otherwise specified. Note also that an explanation of the same components and the like as the first embodiment will be omitted.

Table 7 shows an example of user setting information to be managed by a pull-print application 321 of a printer. The user setting information contains userId indicating the user who gives a pull-print instruction, and enable predict indicating whether to use the print setting prediction function. userId is an identifier for uniquely identifying the user who gives a pull-print instruction. For example, userId can be an ID (identifier) related to a user who logs in to a printer 102 or a user who longs in to a print service 104 on the pull-print application 321. Also, the user setting information is set and held by a user's operation from a user setting screen (not shown) or the like in the pull-print application 321.

TABLE 7

| userId | enable_predict | ... |
|---|---|---|
| userA | false | ... |
| userB | true | ... |
| ... | ... | ... |

In step S421 of FIG. 11A, the pull-print application 321 receives a document information list from the print service 104, and determines whether the print setting prediction function of the operating user is effective by referring to the user setting information. If the print setting prediction function is effective, the process advances to step S1110, and the pull-print application 321 displays a document information list screen 1101 shown in FIG. 11B, and transmits a prediction request to a prediction service 106. On the other hand, if the print setting prediction function is ineffective, the pull-print application 321 displays a document information list screen 401 shown in FIG. 4B.

By the control as described above, this embodiment can switch whether to use the print setting prediction function for each user. This can improve the user-friendliness for print setting.

Third Embodiment

In the pull-printing print instruction sequence of the above embodiment, the print setting predicted by the printer 102 by using the prediction service 106 is automatically set or displayed. However, if the prediction of the print setting is performed by transmitting a prediction request from the printer 102 to the prediction service 106 at the timing at which the document information list screen displays the document information list, this processing may require a long time and may not be in time for a user's print instruction. In this embodiment, a form that performs a prediction process in advance by taking account of the fact that attribute information of a document necessary for prediction is registered when the document is input will be explained below.

As the third embodiment of the present invention, a form in which a print service 104 obtains a predicted value of print setting by using a prediction service 106 at the timing at which a document is input from a client 103 and generates print data in advance by using the predicted print setting will be explained below. Note that the reference numerals and the names are the same as the first embodiment unless otherwise specified. Note also that an explanation of the same components and the like as the first embodiment will be omitted.

[Processing Sequence]

Figure 12A:
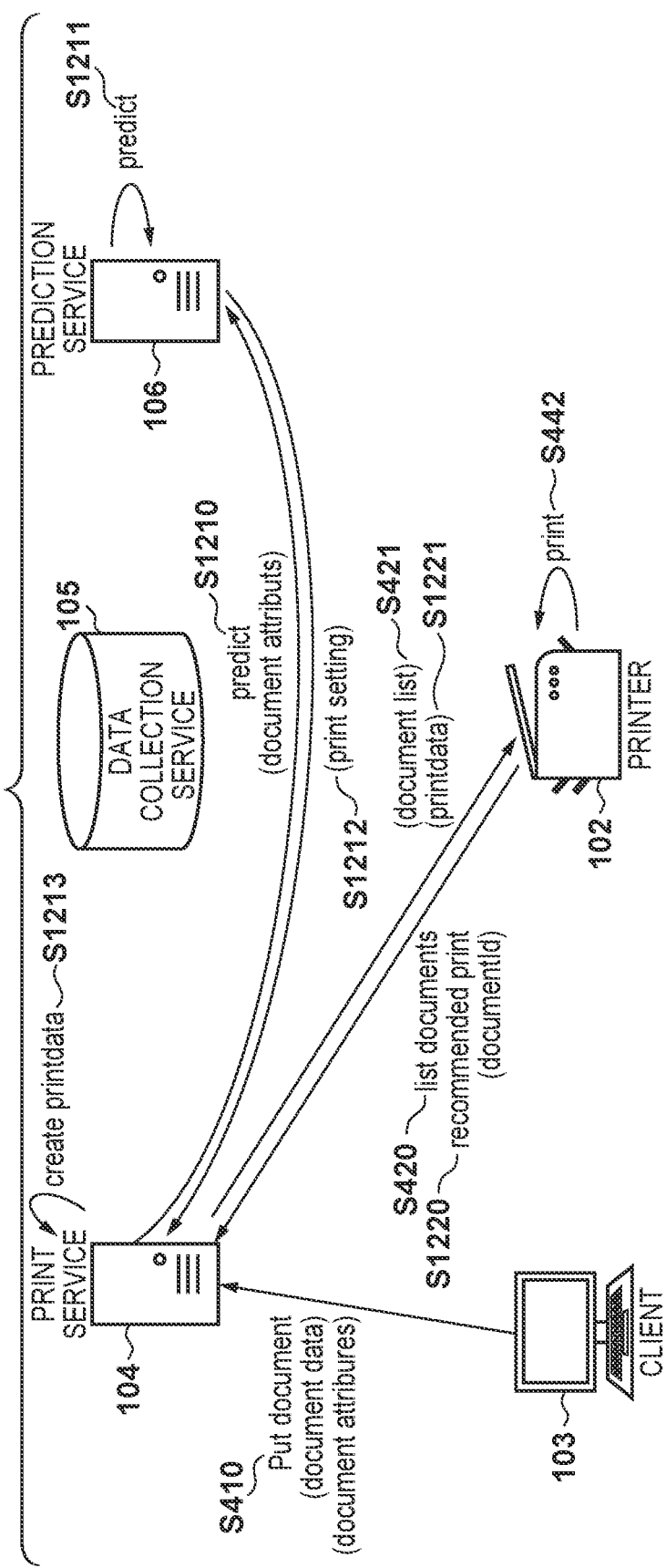
FIGS. 12A and 12B are sequence diagrams of pre-prediction of print setting and pre-generation of print data according to a second embodiment of the present invention.

FIG. 12A is a view showing a sequence by which when accepting a document input request, the print service 104 predicts print setting by using the prediction service 106, and generates print data beforehand based on the predicted print setting.

In step S410, the print service 104 accepts a document input request, and a print manager 342 registers document information. In step S1210, the print service 104 transmits a print attribute prediction request containing the registered document to a prediction API 361 of the prediction service 106.

In step S1211, the prediction service 106 performs a print setting prediction process by using a learned model allocated in a learning model 362.

In step S1212, the prediction service 106 returns print setting as the prediction result in step S1211 to the print service 104.

In step S1213, the print manager 342 transfers the print setting received from the prediction service 106 and the document information registered in step S410 to a print data generator 343, and instructs the print data generator 343 to generate print data. Also, the print manager 342 registers print job information corresponding to the print data. The print data generator 343 generates print data in accordance with the instruction from the print manager 342, and saves the print data in a storage 344.

Figure 12B:
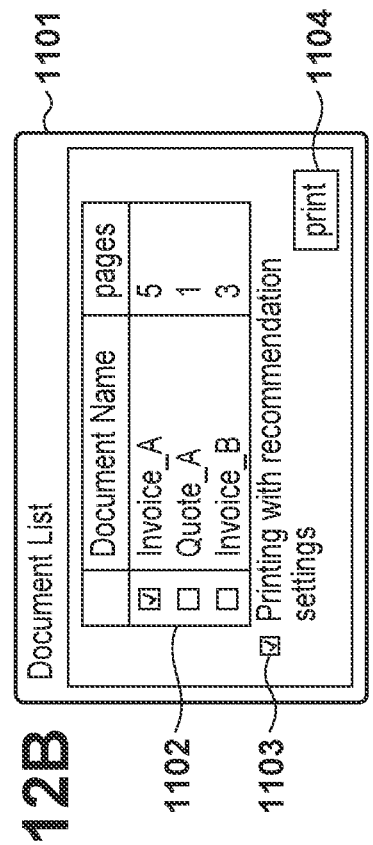

Assume that on a document information list screen 1101 shown in FIG. 12B, a document is selected in a document information list 1102 and a print button 1104 is pressed while a printing-with-recommendation-settings check box 1103 is checked by a user's operation. In this case, in step S1220, a pull-print application 321 transmits a printing-with-recommendation-settings request to the print service 104.

In step S1221, the print service 104 accepts the printing-with-recommendation-settings request by the print API, extracts the print data generated by the print setting predicted in step S1211 from the storage 344 by using the document ID as a key, and returns the print data to a printer 102.

In this embodiment as described above, when the document information list is displayed, the printer can give a print instruction using the print setting predicted beforehand by the print service without performing the print setting prediction process by using the prediction service. In addition, since the print service generates print data in advance, the user using printing with recommendation settings can start printing without waiting for the generation of print data. As a consequence, the user-friendliness of pull printing can be improved. Note that when the print button 1104 is pressed with the printing-with-recommendation-settings check box 1103 being not checked, it is also possible to display the print setting screen and display the predicted print setting as an initial value as described in the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-061360, filed Mar. 27, 2019, which is hereby incorporated by reference herein in its entirety.

What is claimed is:

1. A print system for providing print data to a printer across a network, the print system comprising:
    at least one memory containing instructions;
    at least one processor to execute the instructions to operate as:
    a managing unit configured to accept and manage document data as a print target;
    an issuing unit configured to issue, when a print request for document data managed by the managing unit is accepted, print data based on print setting indicated by the print request;
    an accumulation unit configured to accumulate, as collected data, print setting used for print data issued by the issuing unit and document attribute information indicated by document data used for the print data in association with each other;
    a generation unit configured to generate, from the collected data accumulated in the accumulation unit, training data including a pair of input data containing the document attribute information and ground truth data containing the print setting;
    a processing unit configured to perform, by machine learning, generation of a learning model to be used to predict print setting, by using the training data generated by the generation unit;
    a prediction unit configured to predict, when accepting a prediction request, print setting by using the learning model generated by the processing unit and by using document attribute information indicated by the prediction request as input data; and
    a providing unit configured to provide the print setting predicted by the prediction unit to a request source of the prediction request.

2. The system according to claim 1, wherein the printer comprises:
    at least one memory containing instructions; and
    at least one processor to execute the instructions to operate as:
    an accepting unit configured to accept designation of document data as a print target; and
    a requesting unit configured to transmit, when the accepting unit accepts designation of document data, the prediction request to the print system by using document attribute information indicated by the document data.

3. The system according to claim 2, wherein
    the printer further executes instructions to operate as a holding unit configured to hold setting information indicating whether to predict print setting, and
    the requesting unit controls the transmission of the prediction request based on the setting information.

4. The system according to claim 3, wherein the setting information is set for each user.

5. The system according to claim 1, wherein when the managing unit accepts new document data, the print system issues the prediction request by using document attribute information indicated by the new document data.

6. The system according to claim 1, wherein
    the printer further executes instructions to operate as a setting unit configured to accept, when accepting designation of document data as a print target, designation indicating whether to perform printing by using print setting predicted by the prediction unit, and
    in a case where the setting unit accepts designation indicating that printing is to be performed by using print setting predicted by the prediction unit, a print setting screen is not displayed, and a print request for the document data using print setting predicted by the prediction unit is transmitted to the print system.

7. The system according to claim 6, wherein when the setting unit accepts designation indicating that printing is to be performed without using print setting predicted by the prediction unit, the print setting screen on which print setting predicted by the prediction unit is indicated as an initial value in a setting item is displayed.

8. The system according to claim 1, wherein the processing unit generates a learning model for each setting item contained in the print setting.

9. A print setting prediction method in a print system for providing print data to a printer across a network, the method comprising:
    accepting document data as a print target and managing the document data by a managing unit;
    issuing, when a print request for document data managed by the managing unit is accepted, print data based on print setting indicated by the print request;
    causing an accumulation unit to accumulate, as collected data, print setting used for print data issued by the issuing and document attribute information indicated by document data used for the print data in association with each other;
    generating, from the collected data accumulated in the accumulation unit, training data including a pair of input data containing the document attribute information and ground truth data containing the print setting;
    performing, by machine learning, generation of a learning model to be used to predict print setting, by using the training data generated in the generating;
    predicting, when accepting a prediction request, print setting by using the learning model generated in the performing and by using document attribute information indicated by the prediction request as input data; and
    providing the print setting predicted in the predicting to a request source of the prediction request.

10. A non-transitory computer-readable storage medium storing a program for causing a computer to function as:
    a managing unit configured to accept and manage document data as a print target;
    an issuing unit configured to issue, when a print request for document data managed by the managing unit is accepted, print data based on print setting indicated by the print request;
    an accumulation unit configured to accumulate, as collected data, print setting used for print data issued by the issuing unit and document attribute information indicated by document data used for the print data in association with each other;

a generation unit configured to generate, from the collected data accumulated in the accumulation unit, training data including a pair of input data containing the document attribute information and ground truth data containing the print setting;

a processing unit configured to perform, by machine learning, generation of a learning model to be used to predict print setting, by using the training data generated by the generation unit;

a prediction unit configured to predict, when accepting a prediction request, print setting by using the learning model generated by the processing unit and by using document attribute information indicated by the prediction request as input data; and a providing unit configured to provide the print setting predicted by the prediction unit to a request source of the prediction request.

* * * * *